(12) United States Patent
Riba et al.

(10) Patent No.: US 10,563,574 B2
(45) Date of Patent: Feb. 18, 2020

(54) LENGTH-ADJUSTABLE CONNECTING ROD WITH A CYLINDER-PISTON ASSEMBLY WITH AN OIL FILTER

(71) Applicants: iwis motorsysteme GmbH & Co. KG, München (DE); AVL LIST GMBH, Graz (AT)

(72) Inventors: Zoltán Riba, Olching (DE); Kai Arens, München (DE); Martin Bodensteiner, München (DE); Steffen Latz, München (DE); Malte Heller, München (DE)

(73) Assignees: IWIS MOTORSYSTEME GMBH & CO. KG, München (DE); AVL LIST GMBH, Graz (AT)

( * ) Notice: Subject to any disclaimer, the term of this patent is extended or adjusted under 35 U.S.C. 154(b) by 0 days.

(21) Appl. No.: 15/801,610

(22) Filed: Nov. 2, 2017

(65) Prior Publication Data
US 2018/0119611 A1 May 3, 2018

(30) Foreign Application Priority Data
Nov. 3, 2016 (DE) .......................... 10 2016 120 975

(51) Int. Cl.
*F02B 75/32* (2006.01)
*F02B 75/04* (2006.01)
(Continued)

(52) U.S. Cl.
CPC ............ *F02B 75/045* (2013.01); *F15B 11/16* (2013.01); *F15B 21/041* (2013.01); *F16C 7/06* (2013.01);
(Continued)

(58) Field of Classification Search
CPC .................................. F02B 75/045; F16C 7/06
(Continued)

(56) References Cited

U.S. PATENT DOCUMENTS 2,217,721 A 10/1940 Anthony
5,146,879 A * 9/1992 Kume ...................... F01M 1/06
123/48 B
(Continued)

FOREIGN PATENT DOCUMENTS

CN 105937444 A 9/2016
DE 10 2005 055 199 A1 5/2007
(Continued)

*Primary Examiner* — Long T Tran
*Assistant Examiner* — James J Kim
(74) *Attorney, Agent, or Firm* — Baker & Hostetler LLP

(57) ABSTRACT

A length-adjustable connecting rod for an internal combustion engine, comprises a first connecting rod member, a second connecting rod member and at least one cylinder-piston assembly for adjusting the first connecting rod member relative to the second connecting rod member. The cylinder-piston assembly can be actuated by way of a hydraulic adjustment mechanism, where the hydraulic adjustment mechanism comprises at least one oil filter in order to filter the engine oil of the internal combustion engine flowing into the cylinder-piston assembly. The invention further relates to an internal combustion engine with such a length-adjustable connecting rod and the use of such a cylinder-piston assembly for a length-adjustable connecting rod of an internal combustion engine.

18 Claims, 2 Drawing Sheets

(51) Int. Cl.
  *F15B 11/16*    (2006.01)
  *F15B 21/041*   (2019.01)
  *F16C 7/06*     (2006.01)

(52) U.S. Cl.
  CPC . *F15B 2211/30* (2013.01); *F15B 2211/30505* (2013.01)

(58) Field of Classification Search
  USPC ...................................................... 123/197.3
  See application file for complete search history.

(56) References Cited

U.S. PATENT DOCUMENTS

| | | | | |
|---|---|---|---|---|
| 5,724,863 A * | 3/1998 | Kramer | ................... | F02B 41/04 123/48 R |
| 6,273,057 B1 * | 8/2001 | Schwoerer | .............. | F01L 13/06 123/321 |
| 8,746,188 B2 * | 6/2014 | Wilkins | ................ | F02B 75/044 123/48 A |
| 9,828,909 B2 * | 11/2017 | Paul | ...................... | F02B 75/045 |
| 9,976,593 B2 * | 5/2018 | Paul | ...................... | F02B 75/045 |
| 2002/0011222 A1 * | 1/2002 | Bilek | ........................ | F01B 1/12 123/52.1 |
| 2011/0226220 A1 * | 9/2011 | Wilkins | ................ | F02B 75/044 123/48 B |
| 2015/0075497 A1 * | 3/2015 | Hutzelmann | ......... | F02B 75/044 123/48 A |
| 2015/0159550 A1 * | 6/2015 | Woo | ...................... | F02B 75/045 123/48 A |
| 2015/0300272 A1 * | 10/2015 | Pluta | ..................... | F02B 75/045 123/48 R |
| 2016/0319737 A1 * | 11/2016 | Schaffrath | ............. | F02B 75/045 |
| 2017/0022895 A1 * | 1/2017 | Balling | ................ | F16K 27/041 |

FOREIGN PATENT DOCUMENTS

| | | |
|---|---|---|
| DE | 10 2015 103 205 U1 | 9/2016 |
| EP | 0 599 125 B1 | 3/1997 |
| EP | 1 426 584 A1 | 6/2004 |
| WO | 2013/092364 A1 | 6/2013 |
| WO | 2015/055582 A2 | 4/2015 |

* cited by examiner

LENGTH-ADJUSTABLE CONNECTING ROD WITH A CYLINDER-PISTON ASSEMBLY WITH AN OIL FILTER

CROSS-REFERENCE TO RELATED APPLICATION

This application claims priority to foreign German patent application No. DE 10 2016 120 975.9, filed on Nov. 3, 2016, the disclosure of which is incorporated by reference in its entirety.

FIELD OF THE INVENTION

The present invention relates to a length-adjustable connecting rod for an internal combustion engine, comprising a first connecting rod member, a second connecting rod member and at least one cylinder-piston assembly for adjusting the first connecting rod member relative to the second connecting rod member, where the cylinder-piston assembly can be actuated way of a hydraulic adjustment mechanism. The invention further relates to an internal combustion engine with such a length-adjustable connecting rod and the use of such a cylinder-piston assembly for a length-adjustable connecting rod of an internal combustion engine.

BACKGROUND

The thermal degree of efficiency of an internal combustion engine, in particular of spark ignition engines, is dependent on the compression ratio $\varepsilon$, i.e. the ratio of the total volume prior to compression to the compression volume ($\varepsilon$=(displacement volume $V_h$+compression volume $V_c$)/compression volume $V_c$). As the compression ratio increases, the thermal efficiency increases. The increase in the thermal efficiency over the compression ratio is degressive, but still relatively pronounced in the range of values that are typical nowadays.

In practice, the compression ratio can not be increased arbitrarily since an excessively high compression ratio leads to unintended self-ignition of the combustion mixture due to pressure and temperature increase. This early combustion does not only lead to spark ignition engines not running smoothly and so-called knocking, but can also lead to component damage in the engine. In the partial load range, the risk of self-ignition is less, which, in addition to the influence of ambient temperature and the pressure, also depends on the operating point of the engine. Accordingly, a higher compression ratio is possible in the partial load range. Efforts to match the compression ratio to the respective operating point of the engine have therefore been made in the development of modern combustion engines.

Various solutions exist for the realization of a variable compression ratio (VCR) with which the position of the crankshaft journal of the crankshaft or the piston pin of the engine piston is varied or the effective length of the connecting rod is varied. There are respective solutions for continuous and discontinuous adjustment of the components. Continuous adjustment makes it possible to reduce $CO_2$ emissions and fuel consumption due to a compression ratio which can be adjusted for every operating point. On the other hand, discontinuous adjustment with two steps designed as end stops of the adjustment motion allows for structural and operational advantages and still allows for significant savings in fuel consumption and $CO_2$ emissions compared to a conventional crankshaft drive.

U.S. Pat. No. 2,217,721 already describes an internal combustion engine with a length-adjustable connecting rod with two rod members which can be telescoped into one another and together form a high-pressure space. For filling the high-pressure space with and emptying it of engine oil and thus for changing the length of the connecting rod, a hydraulic adjustment mechanism is provided with a control valve having a spring-biased locking member which can be displaced to an open position due to the pressure of the engine oil.

Discontinuous adjustment of the compression ratio for an internal combustion engine is shown in EP 1 426 584 A1 in which an eccentric connected to the piston pin enables adjustment of the compression ratio. In this case, the eccentric is fixed at the one or the other end position of the pivoting range by use of a mechanical locking mechanism. DE 10 2005 055 199 A1 also discloses the mode of operation of a variable length connecting rod with which different compression ratios are enabled. There as well, the implementation is done by way of an eccentric in the connecting rod small end, which is fixed in position by two hydraulic cylinders with variable resistance.

WO 2013/092364 A1 describes a length-adjustable connecting rod for an internal combustion engine with two rod members that are telescopically displaceable into each other, one rod member forming a cylinder and the second rod member forming a piston element displaceable in length. A high-pressure space is formed between the adjustable piston of the first rod member and the cylinder of the second rod member, which is supplied with engine oil via a hydraulic adjustment mechanism with an oil channel and an oil-pressure-dependent valve. A similar length-adjustable connecting rod for an internal combustion engine with telescopically displaceable rod members is shown in WO 2015/055582 A2.

According to WO 2015/055582 A2, the compression ratio in the internal combustion engine is to be adjusted by way of the connecting rod length. The connecting rod length influences the compression volume in the combustion chamber, where the displacement volume is defined by the position of the crankshaft journal and the cylinder bore. A short connecting rod therefore leads to a smaller compression ratio than a long connecting rod with otherwise identical geometric dimensions, e.g. piston, cylinder head, crankshaft, valve timing, etc With the known length-adjustable connecting rods, the connecting rod length is varied hydraulically between two positions. The entire connecting rod is configured in several parts, where the change in length is effected by way of a telescopic mechanism which can be adjusted by use of a two-way hydraulic cylinder. The connecting rod small end, typically for receiving the piston pin, is connected to a piston rod (telescopic rod member). The associated adjustable piston is guided in an axially displaceable manner in a cylinder which is arranged in the connecting rod member with the connecting rod large end, typically for receiving the crankshaft journal. The adjustable piston separates the cylinder into two pressure spaces, an upper and a lower pressure space. These two pressure spaces are supplied with engine oil via a hydraulic adjustment mechanism, where the latter is supplied with engine oil from the lubrication of the connecting rod bearing. For this purpose, an oil channel is required from the crankshaft journal via the connecting rod bearing to the connecting rod and there via the check valves of the adjustment mechanism into the pressure spaces.

When the connecting rod is in the long position, there is no engine oil in the upper pressure space. The lower pressure space, however, is completely filled with engine oil. During operation, the connecting rod is subjected to alternating pull and push forces due to the gas and mass forces. In the long position of the connecting rod, a pull force is absorbed by mechanical contact with an upper stop of the adjustable piston. As a result, the connecting rod length does not change. A push force applied is transmitted via the piston surface to the lower pressure space filled with oil. Since the check valve of this space prevents oil return, the oil pressure rises, where very high dynamic pressures of well over 1,000 bar can occur in the lower pressure space. The connecting rod length does not change. The connecting rod is hydraulically locked in this direction by the system pressure.

In the short position of the connecting rod, the situation is reversed. The lower pressure space is empty, the upper pressure space is filled with engine oil. A pull force causes a pressure increase in the upper pressure space. A push force is absorbed by a mechanical stop.

The connecting rod length can be adjusted in two steps in that one of the two pressure spaces is emptied. For this purpose, one of the respective two check valves in the feed is bridged by the adjustment mechanism or an associated return flow channel is opened. Engine oil can flow through these return flow channels into the crankcase independently of the pressure difference between the pressure space and the supply device. The respective check valve loses its effect accordingly. The two return flow channels are opened and closed by a control valve, where precisely one return flow channel is always open, and the other is closed. The actuator for switching the two return flow channels is controlled hydraulically by the supply pressure.

The installation space for such a connecting rod is limited both axially and radially. The installation space in the crankshaft direction is limited by the bearing width and the spacing of the counterweights. In the axial direction, only the installation space between the connecting rod small end for supporting the piston pin and the bearing large end for supporting the crankshaft journal and a possible adjusting stroke of the connecting rod is available.

The forces to be transmitted by a connecting rod in an internal combustion engine are considerable, which is why the pressures in the pressure space of the cylinder-piston assembly can also be considerable. In view of the high internal pressures in such a cylinder-piston assembly and an associated hydraulic adjustment mechanism, the fatigue strength of the materials used is critical, but also the configuration of the components with regard to the small installation space.

A further aspect of a length-adjustable connecting rod with a cylinder-piston assembly for use in an internal combustion engine is that the hydraulic adjustment mechanism is typically supplied by the engine oil of the internal combustion engine, the viscosity of which decreases not only with the operating temperature but also with increasing operating time, thereby introducing harmful particles into the adjustment mechanism and the cylinder-piston assembly of the connecting rod. In addition to soot particles which can be generated during combustion in the engine, the engine oil also transports residual cast particles or swarf from the production and machining of the engine. Irrespective of a viscosity decrease of the engine oil and the particles transported into the adjustment mechanism by the engine oil, the adjustment mechanism of a length-adjustable connecting rod must remain operational for a long time.

With regard to the extreme pressure differences in the pressure spaces of a cylinder-piston assembly for a length-adjustable connecting rod of well over 1,000 bar and the effect of the force transmission via the connecting rod to the crankshaft on the power of the internal combustion engine, high-quality contacting sealing devices or structurally formed seals are used in conventional length-adjustable connecting rods. Any leakage from the respectively blocked pressure space leads to the adjustable piston entering into the respective pressure space, whereby a working amount corresponding to the force on the adjustable piston and the travel of the adjustable piston is dissipated, which leads to power loss of the internal combustion engine. Depending on the respective designs of the cylinder-piston assemblies, this power loss is to be deducted from the improved thermal efficiency of the internal combustion engine due to a variable compression ratio. Simple gap seals or piston seals are used as sealing devices in conventional length-adjustable connecting rods with a cylinder-piston assembly. Whereas gap seals have a certain leakage as a result of their design, piston seals as contacting sealing devices can almost prevent leakage. The advantages of gap seals are simple assembly, due to the smaller number of components, and a smaller installation space for the cylinder-piston assembly. On the other hand, the leakage of gap seals, which is inherent to the system, causes not only a power loss but also heat development in the system. in addition to increased aging of the engine oil, high temperatures in the length-adjustable connecting rod could lead to damage to the hydraulic adjustment mechanism and to problems with other components of the length-adjustable connecting rod due to thermal expansion.

Although piston-stroke engines are well-known in many fields of technology, and reciprocating piston engines are constantly optimized, improved and further developed in the automotive industry, the hydraulic adjustment mechanisms of cylinder-piston assemblies of the length-adjustable connecting rods continue to be unsatisfactory despite extensive development and research work, in particular, in terms of the necessary service life of length-adjustable connecting rods over the entire operating time of combustion engines. In conventional reciprocating piston engines, the hydraulic adjustment mechanisms of a cylinder-piston assembly of length-adjustable connecting rods, in addition to wear due to the metallic contact, are subjected to an increased load due to the small installation space available, the extreme temperature stress due to extremely high pressures, and the changing directions of force and also due to the contamination of the engine oil with soot particles and swarf. This leads to rapid wear of the sealing device and to the formation of grooves in the walls of the cylinder-piston assembly and ultimately to failure of the cylinder-piston assembly and power loss of the internal combustion engine.

SUMMARY OF THE INVENTION

It is therefore an object of the present invention to provide a length-adjustable connecting rod with a cylinder-piston assembly with a hydraulic adjustment mechanism which enables improved permanent operability despite high pressure differences, small installation space, high temperature stresses and contamination of the engine oil.

This object is satisfied according to the invention in that the hydraulic adjustment mechanism comprises at least one oil filter in order to filter the engine oil of the internal combustion engine flowing into the cylinder-piston assembly. Cleaning the engine oil with an oil filter integrated into the hydraulic adjustment mechanism before it flows into the cylinder-piston assembly prevents or reduces the introduction of contaminants into the engine oil, in particular large soot particles and swarf, and thus prevents wear of the sealing devices and the formation of grooves in the walls of the cylinder-piston assembly. The at least one oil filter can there be arranged in different components of the hydraulic adjustment mechanism, but preferably in the oil channel upstream of an inlet into the cylinder-piston assembly. Alternatively, the at least one oil filter can also be positioned in the oil supply channel to the control valve in order to facilitate cleaning the oil filter and flushing out soot particles and swarf.

According to one advantageous embodiment, the cylinder-piston assembly comprises a cylinder bore, an adjustable piston arranged in a longitudinally movable manner in the cylinder bore, at least one first pressure space provided in the cylinder bore for receiving the engine oil flowing in, the first pressure space being defined on one side by the movable adjustable piston, and a sealing device being arranged between the outer wall of the adjustable piston and the inner wall of the cylinder bore. Such a cylinder-piston assembly with an adjustable piston arranged in a longitudinally movable manner in the cylinder bore can reliably and permanently implement the function of a length-adjustable connecting rod according to the invention despite the extreme system pressures. The sealing device between the outer wall of the adjustable piston and the inner wall of the cylinder bore prevents the adjustable piston from entering into the first pressure space in order to not further reduce the improvement in efficiency obtained by the variable compression ratio in the cylinders of the internal combustion engine due to the adjustable piston entering into the first pressure space. It is possible to use as a sealing device both gap seals, which leak due to their design, as well as contacting piston seals which are more complex in terms of their design and functionally more susceptible, although they almost prevent leakage. The at least one oil filter in the hydraulic adjustment mechanism cleans the engine oil flowing into the first pressure space for actuating the cylinder-piston assembly and prevents the introduction of large soot particles and swarf from the engine oil into the first pressure space. This prevents the particles present in the engine oil from being introduced into the sealing devices, due to the high system pressures and the motion of the adjustable piston in the cylinder bore. Wear on the inner wall of the cylinder bore and the outer wall of the adjustable piston or on the sealing devices contacting the sealing surfaces, respectively, can be prevented or significantly reduced so as to ultimately prevent damage to and failure of the cylinder-piston assembly.

Preferably, the hydraulic adjustment mechanism can comprise at least one drain valve for delivering the engine oil flowing out from the cylinder-piston assembly toward the exterior, where the drain valve is in the outflow direction arranged downstream of the oil filter. Depending on the degree of contamination of the engine oil with soot particles and swarf, the at least one oil filter can become clogged in a short time and impede or ultimately block the inflow of engine oil into the cylinder-piston assembly. The arrangement of a drain valve, which is positioned in the outflow direction downstream of the oil filter, enables the engine oil flowing out from the first pressure space to flow through the at least one oil filter in a countercurrent manner through the filtered engine oil from the first pressure space. Since the drain valve should be arranged as close as possible to the oil filter, respective control of the drain valve in the hydraulic adjustment mechanism is necessary.

For the engine oil to reliably flow out through the drain valve into the crankcase, the hydraulic adjustment mechanism can comprise at least one check valve which is arranged in the outflow direction downstream of the drain valve. Arranging the check valve in the outflow direction upstream of the control valve and positioning the drain valve, which is open in the inflow direction, or a branch-off with a drain valve, between the check valve and the oil filter enables reliable operation of the hydraulic adjustment mechanism. Furthermore, the control unit of the hydraulic adjustment mechanism, for example a control valve, is protected against a backflow of engine oil with increased contamination from the cylinder-piston assembly by cleaning the oil filter. Alternatively, in the case of a correspondingly robust control valve, the drain valve can also be arranged in the outflow direction downstream of the control valve, whereby the need for a separate check valve is simultaneously dispensed with.

A particular embodiment provides that the adjustable piston of the cylinder-piston assembly is designed as a two-way adjustable piston, where the adjustable piston arranged in a longitudinally movable manner in the cylinder bore forms and respectively defines on one side a first pressure space and a second pressure space for receiving the engine oil. An adjustable piston with a two-way effect allows the stroke of the piston rod to be adjusted both in the direction of a higher compression ratio as well as in the direction of a lower compression ratio with a single cylinder-piston assembly. Unlike in DE 10 2005 055 199 A1, the same adjustable piston is therefore used for bi-directional adjustment of the piston stroke or the compression ratio, respectively. Advantageously, a stepped piston can there be used, with the larger face side of which the connecting rod is pressed to its extended position when applied respective pressure. Due to of the force conditions prevailing in an internal combustion engine, the smaller face side usually suffices for the adjustment in the opposite direction. The hydraulic adjustment mechanism can comprise at least two oil filters, where at least one respective oil filter is arranged in each of a first oil supply channel of the first pressure space and a second oil supply channel of the second pressure space, in order to filter the engine oil flowing into the first pressure space and the second pressure space of the cylinder-piston assembly. This makes it possible to clean the engine oil flowing into the first pressure space and the second pressure space of the cylinder-piston assembly and, accordingly, to prevent soot particles and swarf from the engine oil from entering between the adjustable pistons and the cylinder bore and possible wear and failure of the cylinder-piston assembly.

A favorable embodiment provides that the hydraulic adjustment mechanism comprises a control valve, preferably a hydraulically actuated control valve, for controlling the supply of engine oil flowing into the cylinder-piston assembly into the first pressure space and the second pressure space. The use of a control valve in the hydraulic adjustment mechanism is particularly important in the case of a two-way adjustable piston for rapid and reliable actuation of the length-adjustable connecting rod, in order to control the supply of engine oil into the cylinder-piston assembly. A hydraulically actuated control valve is there useful for simple and continuously reliable operation of the hydraulic adjustment mechanism. The control valve can at the same time also control possible drain valves, which can be necessary when cleaning the oil filters by way of return flow of engine oil.

One further embodiment provides that a respective check valve be arranged in each of the first oil supply channel of the first pressure space and second oil supply channel of the second pressure space, where the check valves are each arranged in the inflow direction of the engine oil upstream of the at least one oil filter in the first oil channel and in the second oil channel. This arrangement of check valves is advantageous, in particular, in combination with the use of a control valve in the hydraulic control mechanism, for achieving simple control of the oil flow, and, if necessary, for ensuring a reliable drain of a return flow of engine oil from the cylinder-piston assembly for cleaning the oil filter.

For a simple design of the length-adjustable connecting rod, the first connecting rod member can be connected to the adjustable piston of the cylinder-piston assembly and the second connecting rod member can comprise the cylinder bore of the cylinder-piston assembly.

Furthermore, the invention relates to the use of a cylinder-piston assembly for a length-adjustable connecting rod of an internal combustion engine with a hydraulic adjustment mechanism, the length-adjustable connecting rod comprising a first connecting rod member and a second connecting rod member; where the cylinder-piston assembly can be actuated by way of the hydraulic adjustment mechanism to move the first connecting rod member relative to the second connecting rod member, where the hydraulic adjustment mechanism comprises at least one oil filter for filtering the engine oil of the internal combustion engine flowing into the cylinder-piston assembly. The use of such a cylinder-piston assembly for a length-adjustable connecting rod of an internal combustion engine with a hydraulic adjustment mechanism with an oil filter allows the use of engine oil as the drive for the hydraulic adjustment mechanism, despite the very small dimension of the cylinder-piston assembly and the extremely high system pressure, and simultaneously prevents the introduction of dirt particles from the engine oil into the cylinder-piston assembly and the associated risk of damage and wear of the sealing surfaces and of failure of the cylinder-piston assembly. The cylinder-piston assembly is there actuated by use of the gas and mass forces of the internal combustion engine acting upon the connecting rod members, while the position of the connecting rod members is locked by the engine oil present in the at least one pressure space.

In one further aspect, the invention relates to an internal combustion engine with at least one reciprocating piston and at least one adjustable compression ratio in a cylinder and a length-adjustable connecting rod connected to the reciprocating piston according to the above-described embodiments. All reciprocating pistons of an internal combustion engine are preferably equipped with such a length-adjustable connecting rod, but this is not required. The fuel saving effect of such an internal combustion engine can be considerable and amount to up to 20% when the compression ratio is adjusted accordingly, depending on the respective operating condition. Advantageously, the cylinder-piston assembly of the length-adjustable connecting rod can be connected to the engine oil hydraulics of the internal combustion engine. It must there be taken into account that soot particles and swarf are present in the engine oil and require ruggedness of the hydraulic adjustment mechanism and the sealing device. The less the input of dirt particles from the engine oil, the more safe operation of the cylinder-piston assembly can be ensured. In addition, the adjustment mechanism of the length-adjustable connecting rod can also be controlled by way of the pressurized engine oil.

One further modification provides that the system pressure of the engine oil in the pressure space of the cylinder-piston assembly ranges between 1000 bar and 3000 bar, preferably between 2000 bar and 3000 bar. The limitation of the system pressure enables a reliable configuration of the internal diameter of the cylinder bore and the wall thickness of the cylinder, and thereby enables a reliable configuration of the length-adjustable connecting rod according to the invention.

According to one further development, a timing drive can be provided, with at least one timing chain, a tensioning and/or guide rail, and/or a chain tensioner, connecting the crankshaft to the at least one camshaft of the internal combustion engine. The timing derive is important in that it can have significant influence on the dynamic load of the internal combustion engine and thereby also on the length-adjustable connecting rod. it is preferably configured in such a manner that no excessive dynamic forces are introduced via the timing drive. Alternatively, such a timing drive can also be configured with a spur gear toothing or a drive belt, for example a toothed belt, which is pre-loaded by use of a tensioning device with a tensioning roller.

BRIEF DESCRIPTION OF THE DRAWINGS

In the following, an embodiment is explained in more detail with reference to a drawing, where.

DETAILED DESCRIPTION

Figure 1:
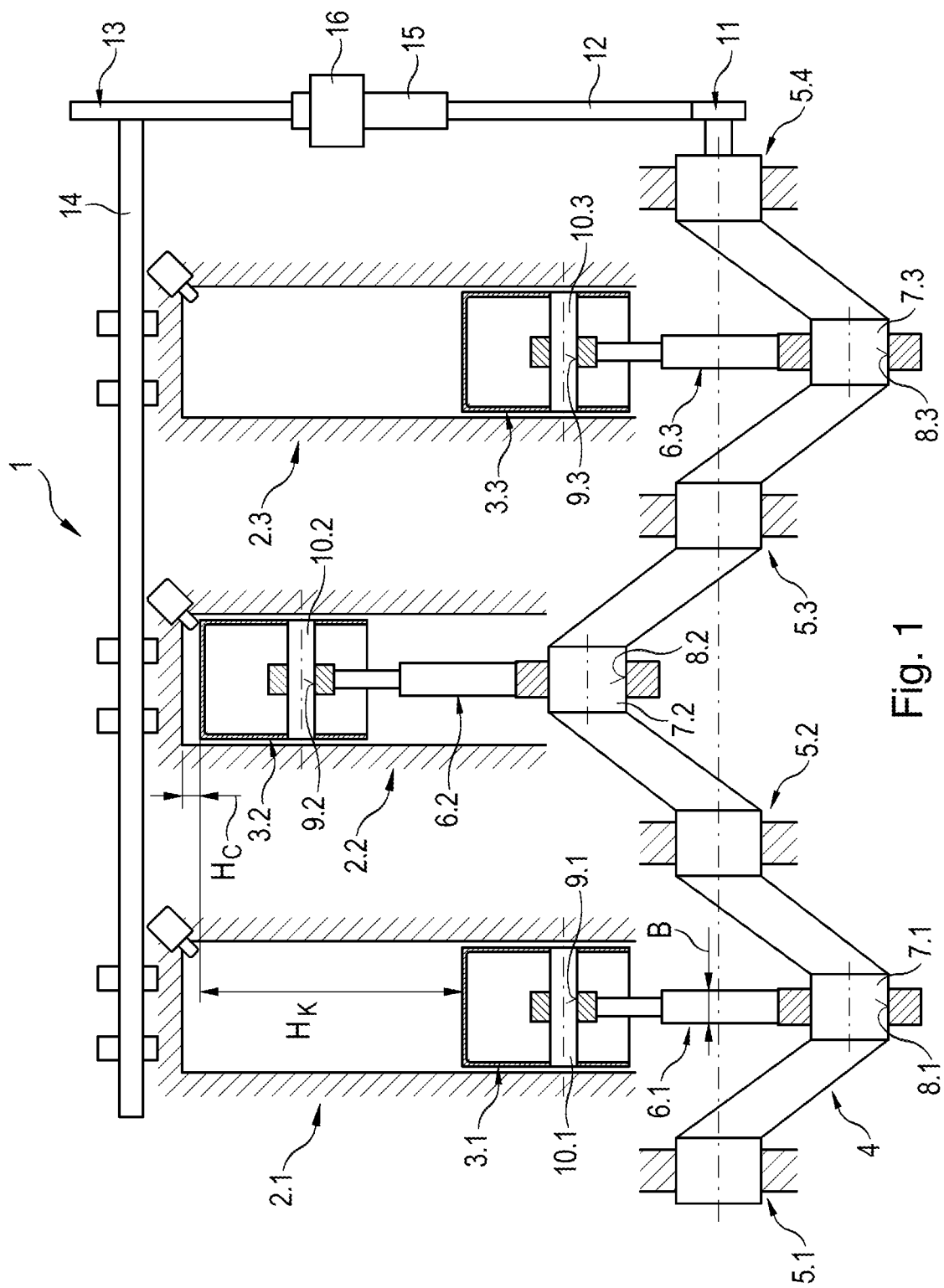
FIG. 1 shows a schematic cross-sectional view through an internal combustion engine.

FIG. 1 is a schematic representation of an internal combustion engine (spark ignition engine) 1. Internal combustion engine 1 has three cylinders 2.1, 2.2 and 2.3, in each of which a reciprocating piston 3.1, 3.2, 3.3 moves up and down. Furthermore, internal combustion engine 1 comprises a crankshaft 4 which is rotatably mounted by way of crankshaft bearings 5.1, 5.2, 5.3 and 5.4. Crankshaft 4 is connected to associated reciprocating pistons 3.1, 3.2 and 3.3 by way of respective connecting rods 6.1, 6.2 and 6.3. Crankshaft 4 comprises an eccentrically arranged crankshaft journal 7.1, 7.2 and 7.3 for each connecting rod 6.1, 6.2 and 6.3. Each connecting rod large end 8.1, 8.2, and 8.3 is supported on the associated crankshaft journal 7.1, 7.2 and 7.3 Each connecting rod small end 9.1, 9.2 and 9.3 is supported on a piston pin 10.1, 10.2 and 10.3 and is thereby pivotally connected to associated reciprocating piston 3.1, 3.2 and 3.3. Neither an absolute nor a relative size arrangement can be gathered from the terms connecting rod small end 9.1, 9.2 and 9.3 and connecting rod large end 8.1, 8.2 and 8.3, but they merely serve to distinguish the components and to associate them with the internal combustion engine shown in FIG. 1. Accordingly, the dimensions of the diameters of connecting rod small ends 9.1, 9.2 and 9.3 can be smaller, equal or larger than the dimensions of the diameters of connecting rod large ends 8.1, 8.2 and 8.3.

Crankshaft 4 is provided with a crankshaft sprocket 11 and is coupled to a camshaft sprocket 13 by way of a timing chain 12. Camshaft sprocket 13 drives a camshaft 14 with its associated cams for actuating the intake and exhaust valves (not shown in detail) of each cylinder 2.1, 2.2 and 2.3. The return span of timing chain 12 is tensioned by use of a pivotally arranged tensioning rail 15 which is pressed thereagainst by use of a chain tensioner 16. The drive span of timing chain 12 can slide along a guide rail. The essential mode of operation of this timing system, including the fuel injection and ignition by way of a spark plug, is not explained in detail and is assumed to be known. The eccentricity of crankshaft journals 7.1, 7.2 and 7.3 substantially determines the stroke $H_K$, in particular when, as presently, crankshaft 4 is arranged exactly centrically beneath cylinders 2.1, 2.2 and 2.3. Reciprocating piston 3.1 is shown in its lowermost position in FIG. 1, whereas reciprocating piston 3.2 is shown in its uppermost position. The difference presently defines stroke $H_K$. The remaining height $H_C$ (see cylinder 2.2) determines the remaining compression height in cylinder 2.2. In connection with the diameter of reciprocating piston 3.1, 3.2 or 3.3 or associated cylinders 2.1, 2.2 and 2.3, respectively, the stroke volume $V_h$ is obtained from stroke $H_K$ and the compression volume $V_c$ is calculated from the remaining compression height $H_C$. Compression volume $V_c$ is of course decisively dependent on the design of the cylinder cover. Compression ratio ε results from these volumes $V_h$ and $V_c$. In detail, compression ratio ε is calculated from the sum of displacement volume $V_h$ and compression volume $V_c$ divided by compression volume $V_c$. Typical values today for spark ignition engines range between 10 and 14 for ε.

To enable the compression ratio ε to be adapted in dependence of the operating point (rotational speed n, temperature T, throttle position) of internal combustion engine 1, connecting rods 6.1, 6.2 and 6.3 are designed to be adjustable in their length. As a result, a higher compression ratio can be obtained in the partial load range than in the full load range.

Figure 2:
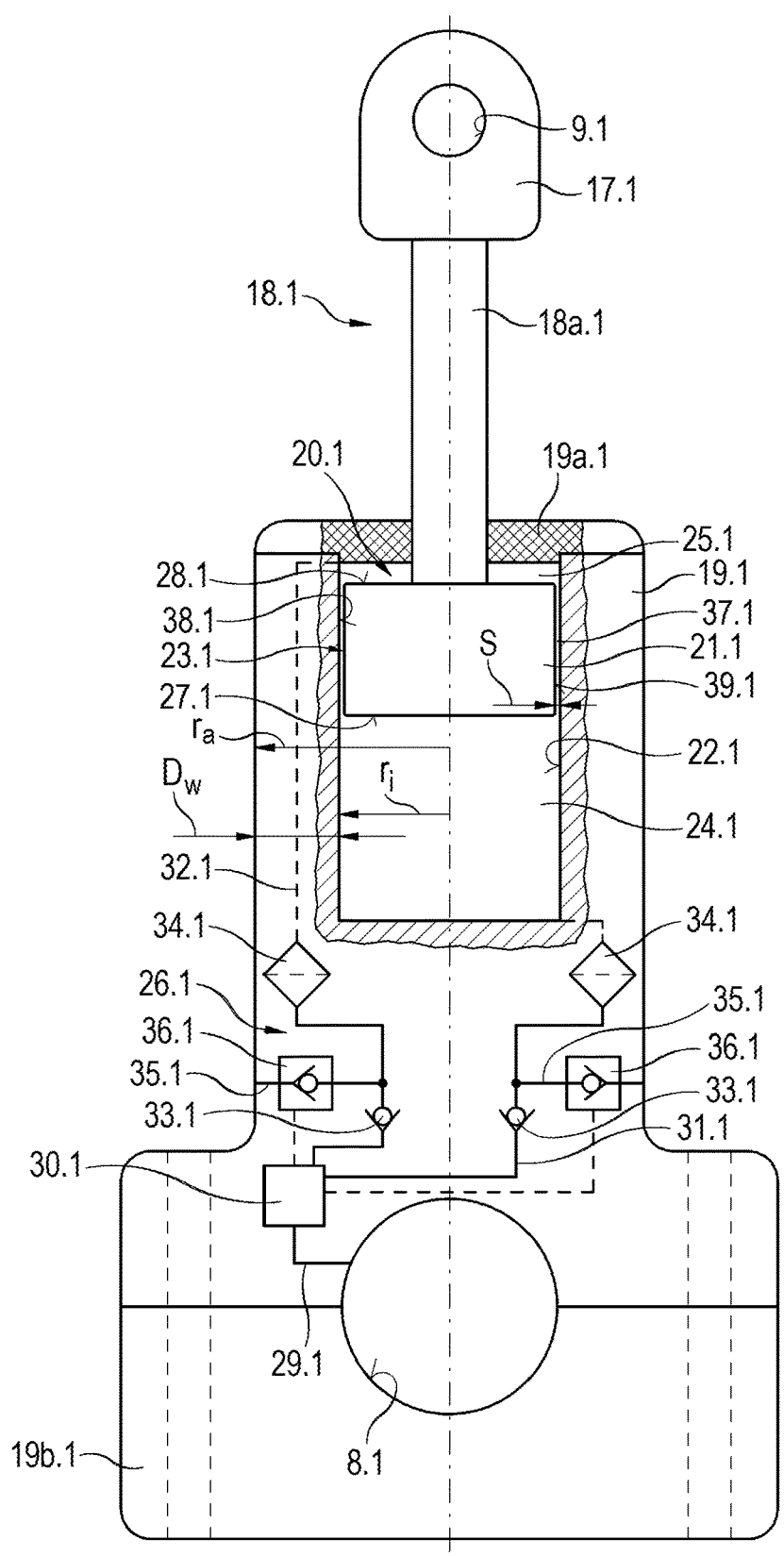
FIG. 2 shows a schematic representation of the length-adjustable connecting rod from FIG. 1 in a partial sectional view.

FIG. 2, by way of example, shows length-adjustable connecting rod 6.1 which is configured to be identical to connecting rods 6.2 and 6.3. The description therefore applies accordingly. Connecting rod 6.1 comprises a connecting rod head 17.1 with said connecting rod small end 9.1, a first connecting rod member 18.1 which is guided telescopically in a second connecting rod member 19.1. The relative motion of first connecting rod member 18.1 in the longitudinal direction relative to second connecting rod member 19.1 is effected by way of a cylinder-piston assembly 20.1 with an adjustable piston 21.1. and a cylinder bore 22.1 as well as a sealing device 23.1 between adjustable piston 21.1 and cylinder bore 22.1. Arranged at second connecting rod member 19.1 is lower bearing shell 19b.1 which, together with the lower portion of second connecting rod member 19.1, surrounds connecting rod large end 8.1. Lower bearing shell 19b.1 and second connecting rod member 19.1 are connected to one another in the typical manner by way of fastening devices. Piston rod 18a.1 at the lower end of first connecting rod member 18.1 is connected to adjustable piston 21.1, which is displaceably guided in cylinder bore 22.1 of second connecting rod member 19.1. At the upper end, second connecting rod member 19.1 comprises a cover 19a.1 through which piston rod 18a.1 of first connecting rod member 18.1 passes and is sealed. Therefore, cover 19a.1 overall seals cylinder bore 22.1. Adjustable piston 21.1 is configured as a stepped piston. A first pressure space 24.1 with a circular cross section is formed below adjustable piston 21.1, and a circular second pressure space 25.1 is formed above adjustable piston 21.1. Adjustable piston 21.1 and cylinder bore 22.1 are part of a hydraulic adjustment mechanism 26.1 for changing the connecting rod length. Adjustment mechanism 26.1 also includes a hydraulic circuit described in more detail below, which is respectively used for the supply or discharge of the hydraulic fluid into or out of pressure spaces 24.1 and 25.1, respectively, and thereby for fixing the adjustable piston 21.1 actuated by way of the forces acting on connecting rod 6.1.

In the present embodiment, the section of second connecting rod member 19.1 in the region of pressure spaces 24.1 and 25.1 and of adjustable piston 21.1 is configured to be circular in cross-section (with the exception of possibly existing hydraulic lines). Other geometrical dimensions are conceivable. Accordingly, the wall thickness $D_W$ presently results from the associated outer radius $r_a$ of the upper section of second connecting rod member 19.1 minus inner radius n of cylinder bore 22.1. In such a symmetrical configuration, the wall thickness $D_W$ is uniformly thick over the circumference of second connecting rod member 19.1 and the stresses in the material of second connecting rod member 19.1 are uniformly low so that the maximum system pressure arising in connecting rod 6.1 due to a relatively large piston diameter of adjustable piston 21.1 is within manageable limits.

Hydraulic adjustment mechanism 26.1 used in connecting rod 6.1 shall be explained in more detail hereafter with reference to FIG. 2. Adjustable piston 21.1 of cylinder-piston assembly 20.1 is configured as a stepped piston. A stepped piston is generally understood to be a piston acting on two sides with effective surfaces of different sizes. A first face side 27.1 is of a circular design and associated with first pressure space 24.1. A second face side 28.1 is of a circular ring design and associated with second pressure space 25.1. Hydraulic adjustment mechanism 26.1 is operated with engine oil. For this purpose, an oil supply channel 29.1 is in communication with connecting rod large end 8.1, as a result of which engine oil can be supplied to hydraulic adjustment mechanism 26.1 or, in an alternative circuit, possibly flows out from the latter. A control valve 30.1 is provided downstream of oil supply channel 29.1 From control valve 30.1, the engine oil enters first pressure space 24.1 via a first oil channel 31.1 and into second pressure space 25.1 via a second oil channel 32.1. In the flow direction of the engine oil flowing in, a check valve 33.1 and an oil filter 34.1 are provided in first oil channel 21.1 upstream of where first oil channel 31.1 opens into first pressure space 24.1. Provided between check valve 33.1 and oil filter 34.1 of first oil channel 31.1 is the branch-off of an outlet channel 35.1 which opens into the crankcase of internal combustion engine 1 on the outer side of second connecting rod member 19.1. Outlet channel 35.1 is configured with a drain valve 36.1 which is closed when the engine oil flows into first pressure space 24.1 via first oil channel 31.1. Second oil channel 32.1 is configured corresponding to first oil channel 31.1, and in the inflow direction of the engine oil into second pressure space 25.1 downstream of control valve 30.1 comprises a check valve 33.1, the branch-off of outlet channel 35.1 with drain valve 36.1, and thereafter oil filter 34.1 upstream of where second oil channel 32.1 opens into second pressure space 25.1.

When control valve 30.1 of hydraulic adjustment mechanism 26.1 opens first oil channel 31.1, the engine oil supplied from connecting rod large end 8.1 via oil supply passage 29.1 flows via check valve 33.1 and oil filter 34.1 into first pressure space 24.1. Driven by the engine oil flowing in, adjustable piston 21.1 travels to its upper position and is then hydraulically blocked in the final extended upper position shown in FIG. 2 since both a return flow via the first oil channel through check valve 33.1 as well as an outflow via outlet channel 35.1 is prevented by blocked drain valve 36.1. Connecting rod 6.1 is therefore in its longer position. When control valve 30.1 is switched for opening second oil channel 32.1 and for filling second pressure space 25.1 with engine oil, then drain valve 36.1 in first oil channel 31.1 is likewise opened so that the engine oil disposed in first pressure space 24.1 can flow via outlet channel 35.1 into the crankcase.

When the engine oil flows in from control valve 30.1 via first oil channel 31.1 into first pressure space 24.1 or via second oil channel 32.1 into second pressure space 25.1, the entire inflow of engine oil is passed through an oil filter 34.1 in which larger soot particles and swarf are filtered out from the engine oil and retained. The engine oil contained in cylinder bore 22.1 of cylinder pistons 21.1 is then only slightly charged with contaminants so that sealing device 23.1 between outer wall 39.1 of adjustable piston 21.1 and inner wall 38.1 of cylinder bore 22.1 is subjected to correspondingly minor wear. As a result, the risk of severe damage to the surface of sealing device 23.1 can be prevented and the necessary service life of the length-adjustable connecting rods 6.1 can be improved.

When connecting rod 6.1 changes from the extended position to the retracted position of first connecting rod member 18.1, the cleaned engine oil flows out from first pressure space 24.1 or second pressure space 25.1, respectively, through the respective oil filter 34.1 in first oil channel 31.1 or in second oil channel 32.1, respectively, and from there via outlet channel 35.1 and drain valve 36.1 into the crankcase, since any further flow in the direction of control valve 30.1 is prevented by check valve 33.1. Alternatively, a return flow of engine oil from first pressure space 24.1 and second pressure space 25.1 of cylinder-piston assembly 20.1 via control valve 30.1 is also possible. During the return flow of clean engine oil from cylinder-piston assembly 20.1 through oil filters 34.1 in first oil channel 31.1 and second oil channel 32.1, the dirt particles deposited in oil filters 34.1 are flushed out. Regularly cleaning oil filters 34.1 not only prevents oil filters 34.1 from clogging, but, in addition to larger particles, also smaller particles are discharged through outlet channel 35.1 which would pass through oil filter 34.1 as the pressure in oil filter 34.1 increases and increase contamination of the engine oil in first pressure space 24.1 and second pressure space 25.1. Cleaning oil filters 34.1 by way of the return flow of engine oil from cylinder-piston assembly 20.1 is very reliable because, as oil filters 34.1 become increasingly fouled, the pressure difference via oil filter 34.1 increases so that the return flow of engine oil through oil filter 34.1 exhibits a higher pressure difference and, correspondingly, a greater cleaning effect.

Control valve 30.1 of hydraulic adjustment mechanism 26.1 of length-adjustable connecting rod 6.1, in addition to supplying engine oil into first oil channel 31.1 and second oil channel 32.1, can also control drain valves 36.1 associated with first oil channel 31.1 and second oil channel 32.1 in branched-off outlet channels 35.1. When first oil channel 31.1 or second oil channel 32.1, respectively, is opened and the engine oil is supplied into first pressure space 24.1 or second pressure space 25.1, respectively, drain valve 36.1 in the other branch of hydraulic adjustment mechanism 26.1, i.e. in second oil channel 32.1 or in first oil channel 31.1, respectively, must also simultaneously be opened in order to enable engine oil to flow out from the respectively other pressure space, i.e. second pressure space 25.1 or first pressure space 24.1, respectively, and adjustable piston 21.1 to enter into second pressure space 25.1 or first pressure space 24.1, respectively. Controlling drain valves 36.1 is preferably also effected via control valve 30.1, where the actuation of control valve 30.1 can be effected with the pressure of the engine oil present in hydraulic adjustment mechanism 26.1. Accordingly, other—alternative, but also possible—electrical, electronic, magnetic or mechanical actuations of control valve 30.1 or of drain valves 36.1 can be avoided.

Cleaning the engine oil flowing into cylinder-piston assembly 20.1 by use of oil filters 34.1 in first oil channel 31.1 and second oil channel 32.1 enables the use of narrow gap seals 37.1 as a sealing device 23.1 with a gap dimension S in the region of adjustable piston 21.1 of at most 20 μm, preferably of at most 10 μm, whereby reliable operation of cylinder-piston assembly 20.1 is ensured in spite of a certain leakage flow through sealing device 23.1. Alternatively, when using piston seals as sealing devices 23.1, the wear of sealing device 23.1 can be significantly reduced due to the engine oil being low in particles in pressure space 24.1 and pressure space 25.1.

LIST OF REFERENCE NUMERALS 1 combustion engine
2.1, 2.2, 2.3 cylinder
3.1, 3.2, 3.3 reciprocating piston
4 crankshaft
5.1, 5.2, 5.3, 5.4 crankshaft bearing
6.1, 6.2, 6.3 connecting rod
7.1, 7.2, 7.3 crankshaft journal
8.1, 8.2, 8.3 connecting rod large end
9.1, 9.2, 9.3 connecting rod small end
10.1, 10.2, 10.3 piston pin
11 crankshaft sprocket
12 timing chain
13 camshaft sprocket
14 camshaft
15 tensioning rail
16 chain tensioner
17.1 connecting rod head
18.1 first connecting rod member
18a.1 piston rod
19.1 second connecting rod member
19a.1 cover
19b.1 bearing shell
20.1 cylinder-piston assembly
21.1 adjustable piston
22.1 cylinder bore
23.1 sealing device
24.1 first pressure space
25.1 second pressure space
26.1 hydraulic adjustment mechanism
27.1 first face side
28.1 second face side
29.1 oil supply channel
30.1 control valve
31.1 first oil channel
32.1 second oil channel
33.1 check valve
34.1 oil filter
35.1 outlet channel
36.1 drain valve
37.1 gap seal
38.1 inner wall
39.1 outer wall
$D_w$ wall thickness
$V_h$ displacement volume
$V_c$ compression volume
$H_C$ compression height
$H_K$ stroke
$r_i$ inner diameter
$r_a$ outer diameter S clearance
ε compression ratio
n rotational speed
T temperature

The invention claimed is:

1. An internal combustion engine comprising:
at least one reciprocating piston;
at least one cylinder that the at least one reciprocating piston is configured to reciprocate within; and
a length-adjustable piston rod connected to the at least one reciprocating piston and configured to adjust a compression ratio of the internal combustion engine, the length-adjustable piston rod comprising:
a first connecting rod member and a second connecting rod member, said first connecting rod member comprising a connecting rod small end for receiving a piston pin and said second connecting rod member comprising a connecting rod large end for receiving a crankshaft journal, where said first connecting rod member is movable relative to said second connecting rod member in order to adjust the distance between said connecting rod large end and said connecting rod small end, and with at least one cylinder-piston assembly for moving said first connecting rod member relative to said second connecting rod member, where said cylinder-piston assembly is actuatable by use of a hydraulic adjustment mechanism, wherein
said hydraulic adjustment mechanism comprises at least one oil filter for filtering engine oil of said internal combustion engine flowing into said cylinder-piston assembly, and
a system pressure of the engine oil in at least one first pressure space of said cylinder-piston assembly ranges between 1,000 bar and 3,000 bar when said connecting rod is hydraulically locked.

2. The internal combustion engine according to claim 1, wherein said cylinder-piston assembly comprises a cylinder bore, an adjustable piston arranged in a longitudinally movable manner in said cylinder bore, the at least one first pressure space, which is provided in said cylinder bore for receiving the engine oil flowing in, said first pressure space being defined on one side by said movable adjustable piston, and further comprises a sealing device arranged between said outer wall of said adjustable piston and said inner wall of said cylinder bore.

3. The internal combustion engine according to claim 1, wherein said hydraulic adjustment mechanism comprises at least one drain valve for delivering the engine oil flowing out from said cylinder-piston assembly to the exterior, where said drain valve is in the outflow direction arranged downstream of said oil filter.

4. The internal combustion engine according to claim 3, wherein said hydraulic adjustment mechanism comprises at least one check valve, where said check valve is arranged in the outflow direction downstream of said drain valve.

5. The internal combustion engine according to claim 1, wherein said adjustable piston of said cylinder-piston assembly is designed as a two-way adjustable piston, where said adjustable piston arranged in a longitudinally movable manner in said cylinder bore forms and respectively defines on one side a first pressure space and a second pressure space for receiving engine oil.

6. The internal combustion engine according to claim 5, wherein said hydraulic adjustment mechanism comprises at least two oil filters, where at least one respective oil filter is arranged in a first oil supply channel of said first pressure space and in a second oil supply channel of said second pressure space, in order to filter the engine oil flowing into said first pressure space and said second pressure space of said cylinder-piston assembly.

7. The internal combustion engine according to claim 5, wherein said hydraulic adjustment mechanism comprises a control valve, preferably a hydraulically actuated control valve, in order to control the supply of the engine oil flowing into said cylinder-piston assembly into said first pressure space and said second pressure space.

8. The internal combustion engine according to claim 7, wherein a respective check valve is arranged in each of said first oil supply channel of said first pressure space and said second oil supply channel of said second pressure space, where said check valves are each arranged in the inflow direction of the engine oil upstream of said at least one oil filter in said first oil channel and in said second oil channel.

9. The internal combustion engine according to claim 1, wherein said first connecting rod member is connected to said adjustable piston of said cylinder-piston assembly and said second connecting rod member comprises said cylinder bore of said cylinder-piston assembly.

10. The internal combustion engine according to claim 1, wherein said cylinder-piston assembly of said length-adjustable connecting rod is connected to engine oil hydraulics of said internal combustion engine.

11. The internal combustion engine according to claim 1, wherein a timing drive is provided with at least one timing chain, a tensioning and/or guide rail, and/or a chain tensioner connecting the crankshaft to the at least one camshaft of said internal combustion engine.

12. The internal combustion engine according to claim 1, wherein the system pressure of the engine oil in said first pressure space of said cylinder-piston assembly ranges between 2,000 bar and 2,500 bar.

13. Use of a cylinder-piston assembly for a length-adjustable connecting rod of an internal combustion engine with a hydraulic adjustment mechanism, said length-adjustable connecting rod comprising a first connecting rod member and a second connecting rod member, said cylinder-piston assembly being actuatable by way of said hydraulic adjustment mechanism, wherein
said hydraulic adjustment mechanism comprises at least one oil filter for filtering engine oil of said internal combustion engine flowing into said cylinder-piston assembly, and
a system pressure of the engine oil in at least one first pressure space of said cylinder-piston assembly ranges between 1,000 bar and 3,000 bar when said connecting rod is hydraulically locked.

14. A length-adjustable connecting rod for an internal combustion engine, with a first connecting rod member and a second connecting rod member, said first connecting rod member comprising a connecting rod small end for receiving a piston pin and said second connecting rod member comprising a connecting rod large end for receiving a crankshaft journal,
wherein said first connecting rod member is movable relative to said second connecting rod member in order to adjust the distance between said connecting rod large end and said connecting rod small end, and with at least one cylinder-piston assembly for moving said first connecting rod member relative to said second connecting rod member, wherein said adjustable piston of said cylinder-piston assembly is designed as a two-way adjustable piston, where said adjustable piston arranged in a longitudinally movable manner in said cylinder bore forms and respectively defines on one side a first pressure space and a second pressure space for receiving engine oil, and wherein said cylinder-piston assembly is actuatable by use of a hydraulic adjustment mechanism, wherein said hydraulic adjustment mechanism comprises a control valve in order to control the supply of the engine oil flowing into said cylinder-piston assembly into said first pressure space and said second pressure space, wherein said hydraulic adjustment mechanism comprises at least two oil filters, where at least one respective oil filter is arranged in a first oil channel of said first pressure space and in a second oil channel of said second pressure space, in order to filter the engine oil flowing into said first pressure space and said second pressure space of said cylinder-piston assembly, wherein a respective check valve is arranged in each of said first oil channel of said first pressure space and said second oil channel of said second pressure space, where said check valves are each arranged in the inflow direction of the engine oil upstream of said at least one oil filter in said first oil channel and in said second oil channel, wherein said hydraulic adjustment mechanism comprises drain valves, where a drain valve is assigned to each of said first and second oil channels and for delivering the engine oil flowing out from said cylinder-piston assembly to the exterior, and where each drain valve is controlled by said control valve and in the outflow direction arranged downstream of said respective oil filter.

15. The length adjustable connecting rod according to claim 14, wherein said cylinder-piston assembly comprises a cylinder bore, an adjustable piston arranged in a longitudinally movable manner in said cylinder bore, at least one first pressure space provided in said cylinder bore for receiving the engine oil flowing in, said first pressure space being defined on one side by said movable adjustable piston, and further comprises a sealing device arranged between said outer wall of said adjustable piston and said inner wall of said cylinder bore.

16. The length adjustable connecting rod according to claim 14, wherein said check valve is arranged in the outflow direction downstream of a respective one of said drain valve.

17. The length adjustable connecting rod according to claim 14, wherein said first connecting rod member is connected to said adjustable piston of said cylinder-piston assembly and said second connecting rod member comprises said cylinder bore of said cylinder-piston assembly.

18. The length adjustable connecting rod according to claim 14, wherein the control valve is a hydraulically actuated control valve.

\* \* \* \* \*